United States Patent [19]

Isobe et al.

[11] Patent Number: 4,932,743

[45] Date of Patent: Jun. 12, 1990

[54] OPTICAL WAVEGUIDE DEVICE

[75] Inventors: Tami Isobe; Kiyoshi Yokomori, both of Yokohama, Japan

[73] Assignee: Ricoh Company, Ltd., Tokyo, Japan

[21] Appl. No.: 338,316

[22] Filed: Apr. 14, 1989

[30] Foreign Application Priority Data

Apr. 18, 1988 [JP] Japan ................................. 63-95177
Feb. 27, 1989 [JP] Japan ................................. 63-46092

[51] Int. Cl.⁵ ............................................. G02B 6/34
[52] U.S. Cl. ............................ 350/96.19; 350/96.11; 350/96.12; 350/96.15; 350/96.18; 350/96.34
[58] Field of Search ............... 350/96.11, 96.12, 96.13, 350/96.14, 96.15, 96.17, 96.19, 96.30, 96.34, 96.18; 250/227

[56] References Cited

U.S. PATENT DOCUMENTS

| | | | |
|---|---|---|---|
| 3,584,230 | 6/1971 | Tien | 350/96.19 X |
| 3,610,727 | 10/1971 | Ulrich | 350/96.19 X |
| 3,617,109 | 11/1971 | Tien | 350/96.12 X |
| 3,663,194 | 5/1972 | Greenstein et al. | 350/96.11 X |
| 3,864,016 | 2/1975 | Dakss et al. | 350/96.19 X |
| 3,896,305 | 7/1975 | Ostrowsky et al. | 350/96.11 X |
| 4,152,045 | 5/1979 | Hammer | 350/96.19 |
| 4,565,422 | 1/1986 | Seymour et al. | 350/96.19 |
| 4,637,684 | 1/1987 | Tomita et al. | 350/96.19 |
| 4,653,844 | 3/1987 | Ward | 350/96.15 |
| 4,832,428 | 5/1989 | Miyawaki et al. | 350/96.11 |

FOREIGN PATENT DOCUMENTS

| | | | |
|---|---|---|---|
| 0187299 | 7/1986 | European Pat. Off. | 350/96.11 X |
| 62-204213 | 9/1987 | Japan | 350/96.19 X |

OTHER PUBLICATIONS

IEEE J. Quantum Electronics QE-6, 577 (1970) F. Zernike and J. E. Midwinter, "Improved Version of the Evanscent-Wave Coupler".
Harris et al., "Beam Coupling to Films" J. of the Opt. Soc. of America vol. 60, No. 8 8/70 pp. 1007–1015.
Tangonan et al., "Tapered gap prism couplers . . . Applied Optics" 7/77 vol. 16, No. 7, pp. 1795–1797.

*Primary Examiner*—William L. Sikes
*Assistant Examiner*—Brian M. Healy
*Attorney, Agent, or Firm*—Oblon, Spivak, McClelland, Maier & Neustadt

[57] ABSTRACT

An optical waveguide device which comprises a substrate, an optical waveguide layer formed on the substrate, a gap adjusting layer formed on the optical waveguide layer, a metallic layer formed on the gap adjusting layer to partly cover the gap adjusting layer and having an opening therein, a dielectric adhesive layer disposed in contact with the gap adjusting layer through the opening of the metallic layer, and a dielectric prism disposed on the adhesive layer. The gap adjusting layer has an index of refraction which is lower than that of the optical waveguide layer. An incident light passes through the opeining of the metallic layer. The dielectric adhesive layer has an index of refraction which is higher than that of the optical waveguide layer. The dielectric prism has an index of refraction which is higher than that of the optical waveguide layer.

15 Claims, 3 Drawing Sheets

OPTICAL WAVEGUIDE DEVICE

BACKGROUND OF THE INVENTION

The present invention relates to an optical waveguide device. More particularly, the invention relates to a prism coupling device which is used as an optical coupling means arranged in an optical system comprising optical elements such as an optical integrated circuit, an optical sensor and other optical devices.

As a conventional optical waveguide means for guiding light through a prism into an optical waveguide layer, it is known to use an arrangement in which a prism is pressingly bonded directly on a surface of the optical waveguide layer, so as to easily obtain a waveguide structure having a high coupling efficiency. However, with the conventional structure, the waveguide means is easily influenced from mechanical vibrations and shocks, which changes the coupling efficiency thereof. In order to obviate such a problem, it has been proposed an arrangement in which a gap adjusting layer having a low index of refraction is disposed between a cementing layer having a high index of refraction for bonding the prism and an optical waveguide layer having a high refractive index, so as to keep the gap length between the prism and the optical waveguide constantly unchanged.

However, the above-mentioned prior art arrangement involves a problem of misalignment of light, that is, the light is guided to a wrong point of the waveguide when the light is optically treated, such as when the light is to be condensed or reflected, when the light penetrates an optical element and/or when the light is coupled after guided into the high refractive index waveguide layer, thus degrading the optical characteristic thereof.

SUMMARY OF THE INVENTION

It is therefore a first object of the present invention to provide an optical waveguide device which makes it possible to accurately guide an incident light to a predetermined point in the optical waveguide layer.

A second object of the present invention is to provide an optical waveguide device which itself functions to change the passage of light, polarize or condense the light in addition to guide the light.

To achieve the first object of the present invention, there is provided a prism coupling device comprising: a substrate; an optical waveguide layer formed on the substrate; a gap adjusting layer formed on a surface of the optical waveguide layer, the index of refraction of the gap adjusting layer being lower than that of the optical waveguide layer; a metal layer covering a part of a surface of the gap adjusting layer; an opening formed in the metal layer; a dielectric adhesive layer formed on the gap adjusting layer through the opening on the metal layer, the index of refraction of the dielectric adhesive layer being higher than that of the optical waveguide layer; and a dielectric prism disposed on a surface of the dielectric adhesive layer, the index of refraction of the dielectric prism being higher than that of the optical waveguide layer.

An advantage of the above-mentioned prism coupling device is that it becomes possible to accurately introduce an incident light to a predetermined point in the optical waveguide layer, since the incident light guided to the dielectric prism from outside is introduced to the optical waveguide through the opening of the metal layer.

To achieve the second object of the present invention, there is provided an optical waveguide device comprising a clad layer which has an opening having a specific shape so that the opening functions as an optical element such as an optical passage changing means, a lens means or a mode splitter means.

An advantage of the above-mentioned optical waveguide device is that the device itself functions as an optical passage changing means, a condensing lens means or a mode splitter means, in addition to the waveguide means, simply by selecting the shape of the opening of the clad layer, which makes it possible to delete provision of those optical elements other than the waveguide means.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention is described hereinafter in comparison to a related art, with reference to the drawings.

Figure 3:
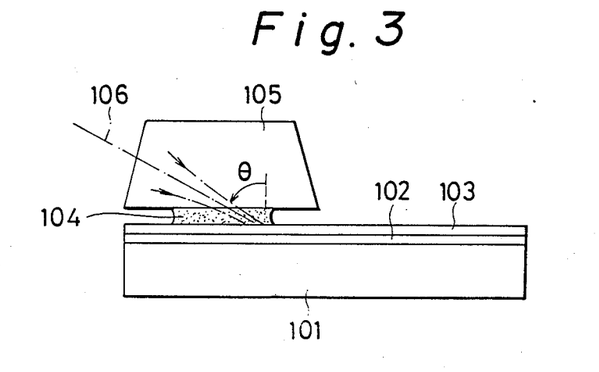
FIG. 3 is a side view of an optical coupling device in accordance with a related art.

FIG. 3 illustrates an example of a structure which makes it possible to maintain the gap between a prism and an optical waveguide layer. As illustrated in the drawing, an optical waveguide layer 102 having a high index of refraction is formed on a substrate 101. A gap adjusting layer 103 having a low index of refraction is formed on an upper surface of the high refractive index waveguide layer 102. A prism having a high index of refraction is disposed on a part of the low refractive index gap adjusting layer 103 through a cementing layer 104 for adhering the prism to the gap adjusting layer 103. Due to the provision of the low refractive index gap adjusting layer 103, influence from mechanical vibrations is attenuated so that the gap between the high refractive index optical waveguide layer 102 and the high refractive index prism 105 is always maintained constant, which makes it possible to keep the optical coupling efficiency unchanged.

However, an incident light 106 which is to be introduced into the high refractive index optical waveguide layer 102 is acted by the optical element disposed on the high refractive index optical waveguide layer 102 which element functions to condense, reflect, pass or couple the incident light. Therefore, to increase the optical coupling efficiency of the structure, it is necessary to irradiate the incident light 106 from a predetermined direction (angle $\theta$ with respect to the normal direction of each layer). Particularly, with regard to the above-mentioned coupling device, it is necessary to arrange the incident point of the incident light 106 at an end of the high refractive index cementing layer 104. However, the incident point is changed according to the adhesive state of the cementing layer 104, which causes the misalignment of the light when the guided light is condensed, reflected, passed or coupled, which degrades the optical characteristic of the device.

Such a problem mentioned above is obviated by embodiments of the present invention as follows.

Figure 1:
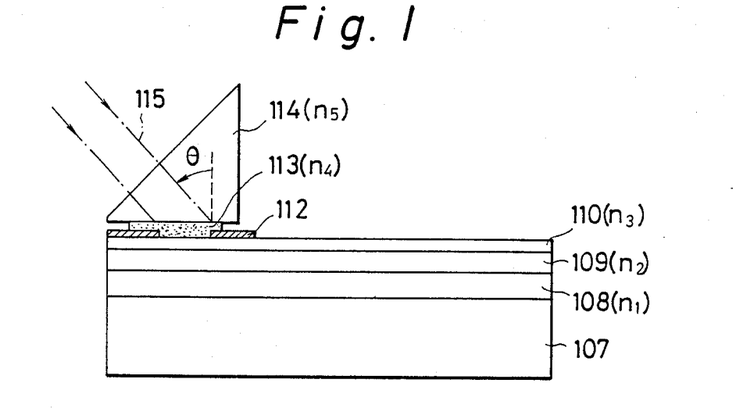
FIG. 1 is a side view of an embodiment of the present invention.
Figure 2:
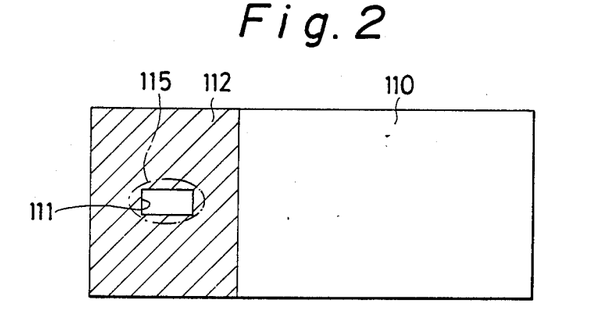
FIG. 2 is a plan view of the metal layer of the structure of FIG. 1 illustrating the opening formed therein.

An embodiment of the present invention is described below with reference to FIGS. 1 and 2. A whole structure of this prism coupling device is as follows. On a substrate 107 is formed a dielectric buffer layer 108 having a low index of refraction. Also, on the buffer layer 108 is formed an optical waveguide layer 109. The index of refraction $n_1$ of the dielectric buffer layer 108 is lower than the index of refraction $n_2$ of the waveguide layer 109. A gap adjusting layer 110 is formed on the optical waveguide layer 109. The gap adjusting layer 110 has an index of refraction $n_3$ which is lower than the index of refraction $n_2$ of the optical waveguide layer 109. A metal layer 112 is formed on an end portion of the low refractive index gap adjusting layer 110. The metal layer 112 has an opening 111 in a center portion thereof as illustrated in FIG. 2. Further, through the opening 111 of the metal layer 112, a dielectric adhesive layer 113 is formed on the gap adjusting layer 110. The index of refraction $n_4$ of the adhesive layer 113 is higher than the refractive index $n_2$ of the optical waveguide layer 109. A dielectric prism 114 is disposed on the dielectric adhesive layer 113. The index of refraction $n_5$ of the prism 114 is higher than the refractive index $n_2$ of the waveguide layer 109. The refractive index $n_4$ of the adhesive layer 113 is approximately the same as the refractive index $n_5$ of the prism 114. With this arrangement, the high refractive index prism 114 is secured to the low refractive index gap adjusting layer 110 through the opening 111 of the metal layer 112 by the dielectric adhesive layer 113.

The size of the opening 111 of the metal layer 112 is slightly smaller than a beam diameter of an incident light 115 which is irradiated to the layered structure from the outside from a direction of an angle $\theta$ with respect to the direction perpendicular to each layer. Also, the refractive index $n_3$ and the thickness of the gap adjusting layer 110 are determined according to the size of the incident light 115 or the size of the opening 111 of the metal layer 112.

The relation between the refractive indices $n_1$ to $n_5$ of the respective layers from the buffer layer 108 to the prism 114 is summarized and represented by the following formula.

$$n_5 \approx n_4 > n_2 > n_3, n_1 \tag{1}$$

An actual example of the material and the forming condition of each layer of the prism coupling device mentioned above is summarized as follows in which the wavelength $\lambda$ of the incident light 115 is 0.79 $\mu$m.
(a) Substrate
  Material: Si
(b) Dielectric Buffer Layer
  Material: SiO$_2$ film ($n_1$ = 1.46)
  Condition: formed by thermal oxidization of Si substrate to film thickness 2 $\mu$m
(c) Optical Waveguide Layer
  Material: SiON film ($n_2$ = 1.55)
  Condition: formed by CVD or sputtering to film thickness 1.5 $\mu$m
(d) Gap Adjustering Layer
  Material: SiO$_2$ film ($n_3$ = 1.46)
  Condition: formed by CVD or sputtering
(e) Metal Layer
  Material: silver
  Condition: formed by vacuum evaporation of the silver after that opning formed by photolithography
(f) Dielectric Adhesive Layer
  Material: transparent material having high refractive index such as polyimide resin ($n_4$ = 1.75)
(g) Dielectric Prism
  Material: Optical Glass having high refractive index ($n_5$ = 1.80)

Various materials and forming conditions can be adopted other than those mentioned above to constitute the prism coupling device in accordance with the present invention.

Each layer of the prism coupling device has specific characteristic as described below. The size of the opening 111 of the metal layer 112 is arranged slightly smaller than the beam diameter of the incident light 115, as mentioned before. Therefore, on the assumption that the longitudinal length of the opening 111 is 1 mm, the maximum coupling condition of the light introduced to the optical waveguide layer 109 in a TE$_0$ mode (which is a linear optical polarization mode to polarize light in a direction perpendicular to the paper in FIG. 1) is satisfied when the low refractive index gap adjusting layer 110 has a film thickness of 0.45 $\mu$m and the incident angle $\theta$ is 58.6 degrees. On this condition, the optical coupling efficiency is 80%. In this case, an equivalent index of refraction N of the optical waveguide layer 109 is represented as N = 1.537, with respect to the guided light in the mode mentioned above, on the condition that the equivalent refractive index N satisfies a phase synchronizing condition represented by the following equation $$N = n_5 \sin \theta \tag{2}$$

wherein the factors $n_5$ and $\theta$ are substituted by the numerical values mentioned above.

If the incident light 115 to be optically coupled has a larger beam diameter than mentioned above, the opening 111 of the metal layer 112 is widened and the low refractive index gap adjusting layer 110 is thickened.

Also, it is desirable to dispose the metal layer 112 only around the portion where the incident light 115 is coupled so as to minimize the area of the metal layer 112 which absorbs the guided light and causes optical waveguide loss with respect to the guided light propagating in the optical waveguide 109, though such an optical loss due to absorption by the metal layer is very small.

In accordance with the prism coupling structure mentioned above wherein the opening 111 is formed in the metal layer 112 so as to receive the incident light 115 impinged to the dielectric prism 114 from outside, it becomes possible to accurately guide the incident light 115 to a predetermined point of the optical waveguide layer 109 and introduce the light into the optical waveguide layer with a high coupling efficiency. Also, in accordance with the multi-layered structure of the embodiment of the present invention mentioned above, it becomes possible to attenuate adverse influence due to mechanical vibrations and shocks acted on the coupling structure.

Note that in the embodiment mentioned above, the substrate 107 is made from Si and the buffer layer 108 is disposed on the substrate. However, if a dielectric substrate having an index of refraction which is lower than that of the optical waveguide layer 109 is used, it is not necessary to provide the low refractive index dielectric buffer layer 108 on the substrate. Also, it is desirable that both the refractive index $n_5$ of the dielectric prism 114 and the refractive index $n_4$ of the dielectric adhesive layer 113 are the same and very high. However, to achieve the objects of the present invention, it is essentially sufficient to arrange the layers in such a way that the refractive index $n_4$ of the adhesive layer 113 is higher than the refractive index $n_2$ of the optical waveguide 109 and that the refractive index $n_5$ of the prism is approximately the same as that of the adhesive layer.

As mentioned above, in accordance with the present invention, the prism coupling device is arranged in such a way that a metal layer is disposed which layer has an opening on the light passage to guide the incident light to the optical waveguide layer, which incident light is irradiated to the prism from outside and that the thickness of the layers is adjusted by the gap adjusting layer. Therefore, unlike the prior art arrangement in which the incident point of the incident light is changed according to the adhesive state of the adhesive layer, the present invention makes it possible to arrange the structure in such a way that the incident light is always guided to a predetermined point of the optical waveguide layer irrespective of the state of the adhesive layer and that the incident light is introduced to the optical waveguide with a high coupling efficiency. Also, due to the structure in which a plurality of layers are disposed between the dielectric prism and the optical waveguide, it becomes possible to maintain a stable condition of the structure since the influence of the mechanical vibrations and shocks is attenuated.

Another embodiment of the present invention is described hereinafter with reference to FIGS. 5 to 7. This embodiment is characterized in that the waveguide structure comprises a clad layer (cover layer) which has an opening having a specific shape so that the opening functions as a specific optical means due to the specific shape thereof.

First, an essential structure of the waveguide to which the present invention is applied is described with reference to FIG. 5. This optical waveguide comprises an optical waveguide layer 31 having an index of refraction $n_F$ and a dielectric constant $\epsilon_F$. The optical waveguide layer 31 is disposed between a substrate 32 having an index of refraction $n_S$ and a dielectric constant $\epsilon_S$ and a clad layer (cover layer) 33 having an index of refraction $n_C$ and a dielectric constant $\epsilon_C$. Note that the dielectric constant $\epsilon_F$ is larger than either of the dielectric constant $\epsilon_S$ and the dielectric constant $\epsilon_C$. An equivalent index of refraction in the waveguide mode can be calculated by substituting the dielectric constants $\epsilon_F$, $\epsilon_S$ and $\epsilon_C$ into an equation of an eigenfunction of the waveguide mode.

Figure 5:
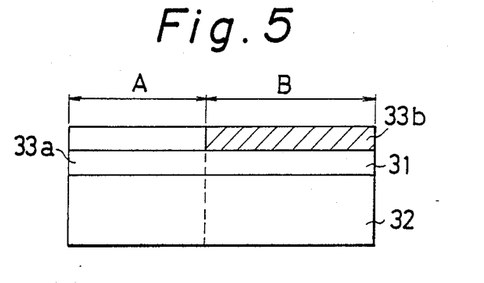
FIG. 5 is an explanatory view for explaining an optical function of the clad layer.

In FIG. 5, the clad layer (cover layer) 33 is divided to two parts, i.e., an A area 33a and a B area 33b formed on the common optical waveguide layer 31 and the substrate 32. The A area is made from a dielectric material to form a dielectric clad layer (cover layer) 33a. The B area is made from a metal to form a metallic clad layer (cover layer) 33b. With regard to the dielectric material, air has the least dielectric constant which is equal to 1 so that the equivalent index of refraction becomes least when the dielectric clad layer 33a comprises air. On the other hand, with regard to the metallic clad layer, the dielectric constant thereof is lower than that of air since the dielectric constant of metal is negative so that the equivalent index of refraction of the metallic clad layer in the waveguide mode becomes less than that of the air clad layer. On the basis of this principle, it can be understood that by changing the shape of the line of the boundary between the dielectric clad layer 33a and the metallic clad layer 33b, the optical characteristic of the clad layer 33 changes so that the clad layer performs various functions such as light passage changing function, optical condensing function and mode split function in accordance with the shape of the boundary between the A area and the B area of the clad layer.

Considering the optical functions of the clad layer (cover layer) mentioned above, the prism coupler in accordance with the present invention is described with reference to FIG. 4. A light irradiated to a prism 13 passes through the prism. The light enters into an optical waveguide layer 12 from the prism 13 through an opening 14a formed in a clad layer (cover layer) 14. Therefore, the opening 14a constitutes a dielectric clad layer (cover layer) comprising air which is surrounded by metal layer which constitutes a metallic clad layer (cover layer), as in the structure of FIG. 5. In other words, the equivalent index of refraction of the opening 14a is higher than that of the clad layer (cover layer) 14 so that by selecting the shape of the opening 14a, it becomes possible that the clad layer performs a specific optical function with respect to the light in accordance with the shape of the opening of the clad layer in addition to the optical waveguide function to propagate the light through the waveguide layer 12.

Also, if the opening 14a is filled with a dielectric material having an index of refraction lower than that of the optical waveguide layer 12, the equivalent index of refraction thereof increases in comparison to the structure wherein the opening comprises air. Also, the light from the prism 13 produces an evanescent wave which is guided into the optical waveguide 12. Therefore, the difference of the equivalent index of refraction between the opening area and the clad area around the opening is increased in comparison to the structure wherein the opening is left unfilled, that is the opening constitutes an air clad layer.

Figure 6:
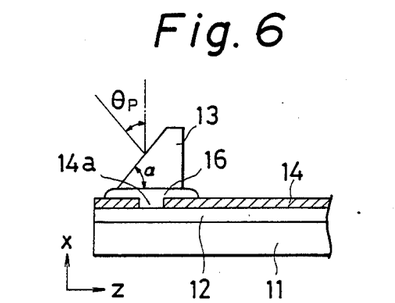
FIG. 6 is a sectional view of another embodiment of the present invention.
Figure 7:
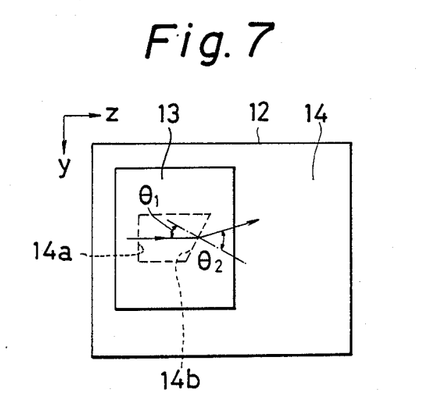
FIG. 7 is a plan view of the optical waveguide device of FIG. 6.

An embodiment of the invention illustrated in FIGS. 6 and 7 is constituted taking the points mentioned above into consideration. This embodiment is characterized in that the opening 14a of the clad layer (cover layer) 14 has a shape such that the boundary 14b on the wave propagation side is inclined with respect to the wave guide direction so that the clad layer functions as a light passage changing means.

This embodiment is described in detail further below. The light propagates in the direction z. An optical waveguide layer 12 comprises a glass substrate 11 made from SiO$_2$ having an index of refraction 1.465 on which substrate an SiON film having an index of refraction 1.700 is formed up to a thickness of 4000 angstroms by a plasma CVD method. On the optical waveguide layer 12 is disposed an Ag film having an index of refraction 0.065−i4.0 formed by a vacuum evaporation method up to a thickness 2000 angstroms. The Ag film is etched to form an opening 14a having a shape as shown in FIG. 7. The boundary 14b is inclined by an angle 30 degrees with respect to the axis y. In other words, the angle $\theta_1$ between the incident light in the direction z and the normal line of the boundary 14b is 30 degrees. After that, the opening 14a is filled with an epoxy resin having an index of refraction 1.581 to constitute a low refractive index layer 16 in and around the opening 14a. A prism 13 made from SFS-1 having an index of refraction 1.9141 is disposed on the epoxy resin and adhered thereto. The gap between the prism 13 and the optical waveguide 12 which is equal to the thickness of the low refractive index layer 16 in the opening 14a is arranged to be 3000 angstroms from the stand point that the maximum coupling efficiency can be obtained when the gap is about a half of the wavelength. Also, the apex angle $\alpha$ of the prism 13 is 50 degrees.

In accordance with the structure mentioned above, when a P-polarized He-Ne laser beam having a wavelength 6328 angstroms is impinged upon the prism 13 from the direction of incident angle $\theta_P = 66.4$ degrees, the TM$_0$ mode is produced in the optical waveguide 12 by SiON thereof. At this moment, the equivalent index of refraction of the TM$_0$ mode in the opening 14a filled with the low refractive index layer 16 is 1.632. On the other hand, the equivalent index of refraction of the TM$_0$ mode in the metallic clad layer around the opening is 1.525. The produced TM$_0$ mode light is impinged upon the boundary 14b from the direction of incident angle $\theta_1 = 30$ degrees and deflected to the direction of angle $\theta_2 = 32.4$ degrees. That is, the laser beam is coupled in a manner that the direction of the laser beam is changed by 2.4 degrees with respect to the light propagation direction (direction z) in the area of the opening 14a.

In accordance with the embodiment of the present invention mentioned above, the equivalent index of refraction of the opening 14a filled with a dielectric material is higher than that of the opening being left opened as an air clad layer so that the difference of the equivalent index of refraction between the opening area and the metallic clad area of Ag becomes larger when the opening is filled with the dielectric material. In this case, if the air clad structure is adopted instead of the epoxy resin clad structure in the opening 14a, the equivalent index of refraction at this portion becomes 1.593 which is lower than the equivalent index of refraction 1.632 on the condition that the low refractive index layer 16 is provided in the opening 14a.

It is to be noted that when the light (guided wave) passes through the metal part of the clad layer 14 (other that the opening area 14a), it is inevitable that at least a part of the light is absorbed by the metal, which causes a propagation loss. Magnitude of the propagation loss corresponds to the imaginary number part of the complex dielectric constant. Therefore, it is desirable to use a metal having a small imaginary number part of the complex dielectric constant, such as Ag having a complex dielectric constant −16.0−i0.52, rather than to use a metal having a large imaginary number part of the complex dielectric constant, such as Al having a complex dielectric constant −47.56−i16.80.

Figure 8:
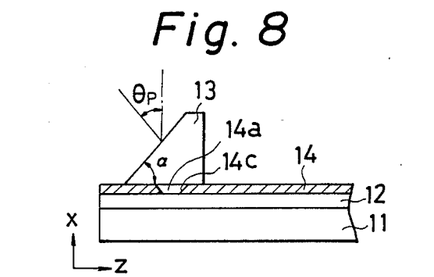
FIG. 8 is a sectional view of a further embodiment of the present invention.
Figure 9:
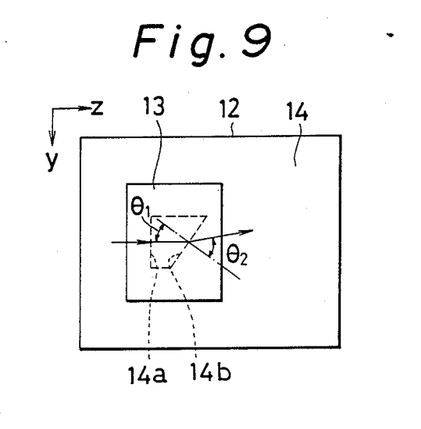
FIG. 9 is a plan view of the optical waveguide device of FIG. 8.

Another embodiment of the present invention is described below with reference to FIGS. 8 to 10. This embodiment is characterized in that in addition that the opening 14a of the clad layer has an inclined boundary so that the clad layer functions as an optical passage changing means as in the case of the previous embodiment mentioned before, the clad layer has a slope coupling portion comprising a surface 14c tapered or sloped with respect to the axis z.

This embodiment is further described in detail below. Note that the light propagates along the direction of the axis z. An optical waveguide layer 12 comprises a heat resisting glass substrate 11 such as Pyrex glass (trade name) on which substrate is formed an SiON film having an index of refraction 1.700 by a plasma CVD process up to a thickness 4000 angstroms. An Ag film of thickness 3000 angstroms is coated on the optical waveguide layer 12 by a vacuum evaporation process. This Ag film is etched to form an opening 14a therein, as shown in FIG. 8. The opening 14a has an inclined boundary 14b and a slope surface 14c. The boundary 14b inclines by 76 degrees with respect to the axis y. In other words, the angle $\theta_1$ between the direction of the axis z and the normal line of the boundary 14b is 76 degrees. A prism 13 is disposed on the opening 14a.

A featured coupling structure of this embodiment is described below with reference to FIG. 10. The coupling structure is characterized by a coupling slope 40. Note that also in FIG. 10, the light propagates in the direction of the axis z as in FIGS. 8 and 9. The drawing illustrates an A area having an equivalent index of refraction $n_A$ and a B area having an equivalent index of refraction $n_B$, wherein $n_A$ is larger than $n_B$. The equivalent index of refraction is gradually changed from $n_A$ to $n_B$ through the slope surface 40 arranged between the A area and the B area rather than steeply stepping from $n_A$ to $n_B$. When the index of refraction changes steppingly at the boundary of a bulk media, a part of the light is reflected on the boundary while another part penetrates the boundary. Such a partial reflection phenomenon occurs in the waveguide structure of a two-dimensional optical system at a portion where the index of refraction steppingly changes. However, in accordance with the embodiment of the present invention, the partial reflection of the guided light is avoided since the light is coupled through the coupling slope surface 40 disposed between the A area and the B area.

Figure 10:
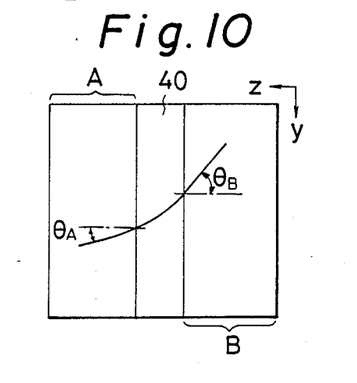
FIG. 10 is an explanatory view for explaining the function of the tapered coupling portion.

In FIG. 10, on the assumption that the incident light is guided to the boundary from the direction of an incident angle $\theta_A$ with respect to the normal line of the boundary 14b and that a condition $$\theta_A < \sin^{-1}(n_B/n_A)$$

is satisfied, all of the incident light penetrates the boundary toward the direction of a refraction angle $$\theta_B = \sin^{-1}(n_A \cdot \sin\theta_A/n_B)$$

with respect to the B area, in accordance with Snell's law. On the other hand, if a condition $$\theta_A \geqq \sin^{-1}(n_B/n_A)$$

is satisfied, all of the incident light is reflected on the boundary (total reflection). The angle $\theta_A = \sin^{-1}(n_B/n_A)$ is called critical angle.

Also, in accordance with the arrangement of the embodiment of the present invention mentioned above, a $TM_0$ mode of the guided light is produced in the optical waveguide 12, on the condition that a P-polarized He-Ne laser beam having a wavelength 6328 angstroms is impinged to the prism 13 made from $TiO_2$ from the direction of an angle of incidence $\theta_P = 26.9$ degrees, wherein the index of refraction of the prism with respect to the P-polarized light is 2.548 while the index of refraction of the prism with respect to the S-polarized light is 2.872 and the apex angle $\alpha$ of the prism is 45 degrees. In this situation, the equivalent index of refraction of the opening 14a (air clad layer) for the $TM_0$ mode is 1.594 while that of the metallic clad layer of Ag surrounding the opening is 1.527. Therefore, the critical angle becomes 73.3 degrees which is derived from $\sin^{-1}(1.527/1.594)$. The inclination angle $\theta_1$ of the boundary of the embodiment of the present invention mentioned above is selected to be 76 degrees which is larger than the critical angle. Therefore, the guided wave in the $TM_0$ mode is totally reflected upon the surface of the boundary 14b.

On the other hand, when an S-polarized He-Ne laser beam is impinged to the prism 13 of $TiO_2$ from the direction of an incident angle $\theta_P = 12.6$ degrees, a guided light of $TE_0$ mode is produced in the waveguide. In this situation, the equivalent index of refraction of the opening 14a (air clad layer) for the $TE_0$ mode is 1.617 while that of the metallic clad layer of Ag surrounding the opening is 1.601. Therefore, the critical angle becomes 81.9 degrees which is derived from $\sin^{-}(1.601/1.617)$. The inclination angle $\theta_1$ of the boundary of the opening in accordance with the embodiment mentioned above is 76 degrees which is smaller than the critical angle so that the guided wave propagating in the $TE_0$ mode penetrated through the boundary toward the direction of the refraction angle $\theta_2 = 78.5$ degrees.

As mentioned above, in accordance with the present invention, the waveguide structure comprises a coupling portion comprising a slope surface 40 which makes it possible to avoid the partial reflection of the guided light at the boundary so that the light efficiently propagates along the waveguide structure and the optical propagation loss is minimized.

A further embodiment of the present invention is described below with reference to FIGS. 11 and 12. This embodiment constitutes a prism coupler having an optical condensing function by constructing the coupling structure in such a way that the opening 14a has a lens like curve shaped portion 14d as illustrated in FIG. 12.

Figure 11:
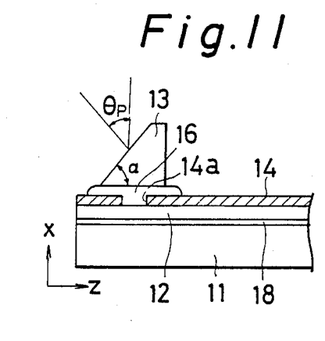
FIG. 11 is a sectional view of a still further embodiment of the present invention.
Figure 12:
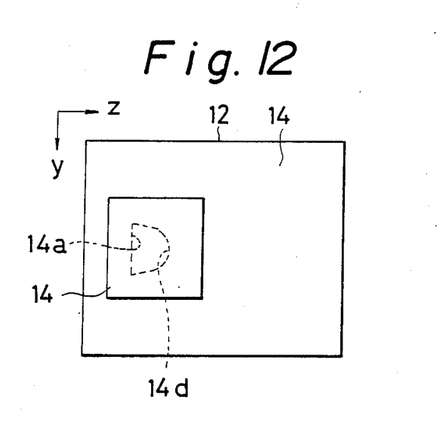
FIG. 12 is a plan view of the optical waveguide device of FIG. 11.

It is to be noted that FIG. 11 illustrates a waveguide structure comprising a buffer layer 18 arranged between an optical waveguide layer and a substrate, however, the buffer layer 18 may be deleted so that the optical waveguide 12 is directly disposed on the substrate 11.

The embodiment is described in detail below. The optical coupling device in accordance with this embodiment of the present invention is produced in such a way described below. First, a buffer layer 18 is formed on a substrate 11 made from Si having a complex index of refraction 3.858 − i0.018 by a thermal oxidization process. The buffer layer 18 is made from $SiO_2$ having an index of refraction 1.465 and thickness of 1.0 μm. An SiN film having an index of refraction 1.850 is formed on the buffer layer 18 up to a thickness 4000 angstroms to constitute an optical waveguide 12. After that, a clad layer (cover layer) 14 of Ag having a complex index of refraction 0.065 − i4.0 is formed on the optical waveguide layer 12 by a vacuum evaporation process. The clad layer 14 is etched to form an opening 14a having a lens like curve surface 14d as shown in FIG. 12. This lens like curve surface is represented in the y-z plane by the following equation.

$$y^2 = 2f\{1 - (ne/ns)\}z + \{(ne/ns)^2 - 1\}z^2$$

This equation represents a shape of a lens having no spherical aberration on the basis of Fermat's principle. In this equation, ne represents the equivalent index of refraction of the lens area, ns represents the equivalent index of refraction of the area surrounding the lens and f represents the focal length of the lens.

After that, the opening 14a is filled with an epoxy resin having an index of refraction 1.581 to form a low refractive index layer 16. A prism 13 made from $TiO_2$ is mounted on this low refractive index layer 16. The distance between the lower surface of the prism 13 and the upper surface of the optical waveguide layer 12 is 3000 angstroms. The apex angle $\alpha$ of the prism 13 is 45 degrees.

In accordance with the structure mentioned above, the equivalent index of refraction ne of the lens area (epoxy resin clad layer) for the $TE_0$ mode in the optical waveguide 12 is 1.774 while the equivalent index of refraction ns of the metallic clad area of Ag surrounding the lens area is 1.656.

In accordance with this structure, when an S-polarized He-Ne laser beam is impinged to the prism 13 made from $TiO_2$ from the direction of an incident angle $\theta_P = 25.0$ degrees, a wave of the $TE_0$ mode is produced and focussed at a focal distance 29.9 mm in the optical waveguide layer 12. On the other hand, when a P-polarized He-Ne lazer beam is impinged to the prism 13 from the direction of an incident angle $\theta_P = 39.5$ degrees, a wave of the $TM_0$ mode is produced and focussed at a focal distance 7.04 mm in the optical waveguide layer 12.

Even if the $TE_0$ mode wave and the $TM_0$ mode wave are simultaneously produced and guided, the respective focal lengths thereof are totally different from each other, which makes it possible to operate the waveguide lens having the curved surface 14d of FIG. 12 to function as a mode beam splitter.

The lens like curved surface 14d illustrated in FIG. 12 is formed symmetrically with respect to the axis z. With this structure, the $TM_0$ mode wave focuses on a point on the middle of the light passage of the $TE_0$ mode wave. Thus, with this arrangement, it is necessary to provide an additional separation process to separate the $TM_0$ mode wave from the $TE_0$ mode wave.

Figure 13:
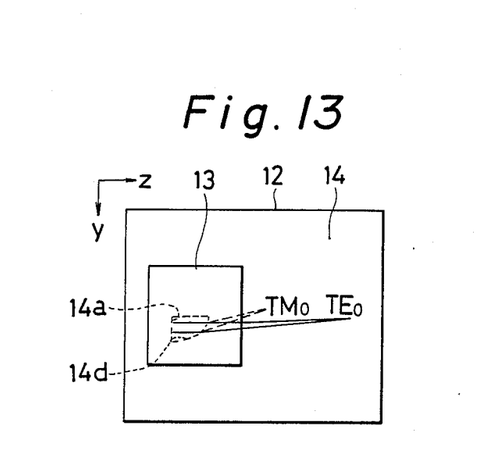
FIG. 13 is a plan view of a still further embodiment of the present invention.

This point is improved in an embodiment illustrated in FIG. 13. This embodiment is arranged in such a way that the passage of the guided light is offset from the optical axis of the lens so that the $TM_0$ mode wave and the TE₀ mode wave are completely separated from each other. Also, it is not necessary to form the curved surface 14d in a symmetrical shape with respect to the axis z. Instead, it is sufficient to provide a half of the lens, as illustrated in FIG. 13.

As mentioned above, in accordance with the embodiments illustrated in FIGS. 5 to 13, it becomes possible to realize an optical coupling device which has an optical function such as an optical passage changing function, an optical condensing function or a mode splitter function in addition to the wave coupling function, so that it becomes unnecessary to prepare an optical device having such a function aside from the coupling device.

Figure 4:
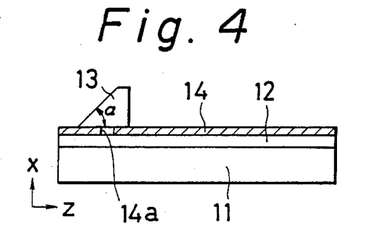
FIG. 4 is a constructional view of an essential structure of the optical waveguide device to which the present invention is applied.
Figure 14A:
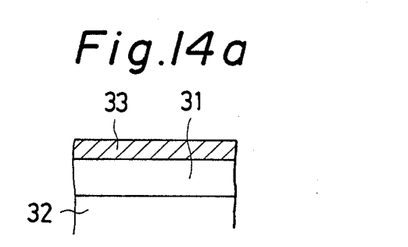
FIGS. 14a and 14b are sectional views of a different variant of the optical waveguide structure in accordance with the present invention, respectively.
Figure 14B:
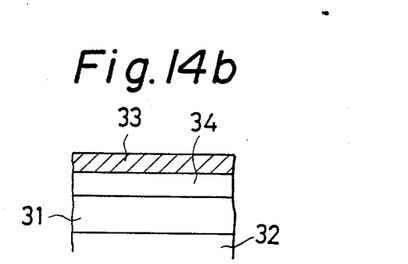

In accordance with the embodiments of the present invention mentioned above, as illustrated in FIG. 14a, a metallic clad layer 33 is directly disposed on an optical waveguide layer 31 (which corresponds to the layer 12 of FIG. 4) formed on a substrate 32 (which corresponds to the layer 11 of FIG. 4). With such a structure, even if the clad layer is made from a metal having a small imaginary number part of the complex dielectric constant such as Ag, the guided light may be absorbed by the metal. If such an absorption of the light by the metal becomes a problem, a buffer layer 34 of a dielectric material may be arranged between the optical waveguide layer 32 and the metallic clad layer 33, as illustrated in FIG. 14b. By the provision of the dielectric buffer layer 34, the propagation loss of light due to the absorption by the metal is attenuated. The thickness of the dielectric buffer layer 34 is determined considering the effect of the clad layer that the equivalent index of refraction of the waveguide mode is lowered in addition to the effect of decreasing the propagation loss of light due to the dielectric buffer layer. The material of the buffer layer is selected so that the absorption coefficient thereof is low with respect to the wavelength of the incident light to be coupled and that the index of refraction thereof is lower than that of the optical waveguide layer 31. Such a dielectric buffer layer 34 can be applied to any of the embodiments mentioned above, if necessary.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical waveguide device comprising:
    a substrate;
    an optical waveguide layer formed on said substrate;
    a gap adjusting layer formed on said optical waveguide layer and having an index of refraction which is lower than that of said optical waveguide layer;
    a metallic layer formed on said gap adjusting layer to partly cover the gap adjusting layer and having an opening through which an incident light passes;
    a dielectric adhesive layer disposed in contact with said gap adjusting layer through said opening of said metallic layer and having an index of refraction which is higher than that of said optical waveguide layer; and
    a dielectric prism disposed on said adhesive layer and having an index of refraction which is higher than that of said optical waveguide layer.

2. An optical waveguide device according to claim 1, wherein the size of said opening is slightly smaller than the beam diameter of said incident light.

3. An optical waveguide device according to claim 1, wherein a dielectric buffer layer having a low index of refraction is disposed between said substrate and said optical waveguide layer.

4. An optical waveguide device according to claim 1, wherein said substrate is made from Si.

5. An optical waveguide device according to claim 3, wherein said buffer layer is made from SiO₂ film.

6. An optical waveguide device according to claim 1, wherein said optical waveguide layer is made from SiON.

7. An optical waveguide device according to claim 1, wherein said gap adjusting layer is made from SiO₂ film.

8. An optical waveguide device according to claim 1, wherein said metallic layer is made from Ag.

9. An optical waveguide device according to claim 1, wherein said adhesive layer is made from a polyimide resin.

10. An optical waveguide device according to claim 1, wherein said opening has a specific shape to perform a specific optical function in accordance with said shape.

11. An optical waveguide device comprising:
    a substrate;
    an optical waveguide layer formed on said substrate;
    a clad layer covering at least a part of said optical waveguide layer and having an opening through which an incident light to be coupled passes; and
    an optical element disposed on said opening of said clad layer for guiding said incident light to said optical waveguide layer,
    wherein said opening has a specific shape to perform a specific optical function in accordance with said shape.

12. An optical waveguide device according to claim 11, wherein the boundary of said opening is inclined with respect to a propagation direction of said incident light so as to perform a function for changing an optical passage.

13. An optical waveguide device according to claim 11, wherein the boundary of said opening has a lens like curved shape so as to perform a condenser function and a mode splitter function.

14. An optical waveguide device according to claim 11, wherein said opening is filled with a dielectric material having a low index of refraction.

15. An optical waveguide device according to claim 11, wherein the thickness of said clad layer in the boundary area adjacent to said opening is changed along the propagation direction of the light so that the index of refraction thereof gradually changes.

* * * * *

UNITED STATES PATENT AND TRADEMARK OFFICE
CERTIFICATE OF CORRECTION

PATENT NO. : 4,932,743

DATED : JUNE 12, 1990

INVENTOR(S) : TAMI ISOBE ET AL.

It is certified that error appears in the above-identified patent and that said Letters Patent is hereby corrected as shown below:

On the title page Item (30):

In the Foreign Application Priority Data, please delete "63-46092" and insert --1-46092--.

Signed and Sealed this

Tenth Day of March, 1992

*Attest:*

HARRY F. MANBECK, JR.

*Attesting Officer*          *Commissioner of Patents and Trademarks*